(12) United States Patent
Tao et al.

(10) Patent No.: US 12,236,569 B2
(45) Date of Patent: Feb. 25, 2025

(54) SYSTEM AND METHOD OF WELDING WORKPIECE BY VISION GUIDED WELDING PLATFORM

(71) Applicants: Tyco Electronics (Shanghai) Co. Ltd., Shanghai (CN); TE Connectivity Services GmbH, Schaffhausen (CH)

(72) Inventors: Zongjie (Jason) Tao, Shanghai (CN); Dandan (Emily) Zhang, Shanghai (CN); Roberto Francisco-Yi Lu, Bellevue, WA (US)

(73) Assignees: TE Connectivity Solutions GmbH, Schaffhausen (CH); Tyco Electronics (Shanghai) Co., Ltd., Switzerland Shanghai (CN)

( * ) Notice: Subject to any disclaimer, the term of this patent is extended or adjusted under 35 U.S.C. 154(b) by 462 days.

(21) Appl. No.: 17/581,244

(22) Filed: Jan. 21, 2022

(65) Prior Publication Data

US 2022/0237768 A1    Jul. 28, 2022

(30) Foreign Application Priority Data

Jan. 22, 2021   (CN) .................. 202110087522.X

(51) Int. Cl.
*G06T 7/80* (2017.01)
*B23K 26/03* (2006.01)
(Continued)

(52) U.S. Cl.
CPC .......... *G06T 7/0004* (2013.01); *B23K 26/032* (2013.01); *B23K 26/21* (2015.10); *B23K 37/04* (2013.01); *G06T 1/0014* (2013.01); *G06T 7/60* (2013.01); *G06T 7/70* (2017.01); *G06T 7/80* (2017.01); *H04N 23/67* (2023.01);
(Continued)

(58) Field of Classification Search
CPC ....... G06T 7/0004; G06T 1/0014; G06T 7/60; G06T 7/70; G06T 7/80; G06T 2207/30152; G06T 2207/30164; G06T 2207/10004; B23K 26/032; B23K 26/21; B23K 37/04; B23K 26/044; H04N 23/67; H04N 17/002;
(Continued)

(56) References Cited

U.S. PATENT DOCUMENTS 11,499,920 B2 * 11/2022 Tsai .................. G01J 3/50
2018/0184070 A1 * 6/2018 Nash .................. H04N 23/67
(Continued)

*Primary Examiner* — Ross Varndell
*Assistant Examiner* — Dustin Bilodeau
(74) *Attorney, Agent, or Firm* — Barley Snyder

(57) ABSTRACT

A method for welding a workpiece with a vision guided welding platform. The welding platform comprises a welding tool, and a camera for guiding the movement of the welding tool from a start point to an end point. The method includes the steps of adjusting a focal length of the camera such that a focal plane of the camera is located on a surface of the workpiece and obtaining a surface image of the workpiece. The method further includes the steps of determining a current focal length of the camera, determining a corrected pixel length of a pixel in the surface image and determining the number of pixels between the start point and the end point of each movement of the welding tool. Using the corrected pixel length, a distance between the start and end points is determined and the welding tool is guided to move therebetween.

19 Claims, 4 Drawing Sheets

(51) Int. Cl.
    *B23K 26/21*   (2014.01)
    *B23K 37/04*   (2006.01)
    *G06T 1/00*    (2006.01)
    *G06T 7/00*    (2017.01)
    *G06T 7/60*    (2017.01)
    *G06T 7/70*    (2017.01)
    *H04N 23/67*   (2023.01)
    *G01N 21/88*   (2006.01)

(52) U.S. Cl.
    CPC . *G01N 21/8851* (2013.01); *G01N 2203/0296* (2013.01); *G06T 2207/30152* (2013.01); *G06T 2207/30164* (2013.01)

(58) Field of Classification Search
    CPC ............... H04N 23/60; G01N 21/8851; G01N 2203/0296
    See application file for complete search history.

(56) References Cited

U.S. PATENT DOCUMENTS

| | | | |
|---|---|---|---|
| 2020/0269340 A1* | 8/2020 | Tang | G06V 10/145 |
| 2021/0206519 A1* | 7/2021 | Shockley | G06T 7/277 |
| 2022/0398778 A1* | 12/2022 | Ryan | G06V 10/44 |

* cited by examiner

```
                                                      ┌─ S10
┌─────────────────────────────────────────────────────────┐
│ providing a calibration sample and providing a calibration ruler on the calibration │
│ sample, wherein the calibration ruler has two calibration points, and a spacing between │
│ the two calibration points is known │
└─────────────────────────────────────────────────────────┘
                              │
                              ▼                        ┌─ S11
┌─────────────────────────────────────────────────────────┐
│ adjusting the focal length of the camera so that the camera focuses on a surface of the │
│ calibration sample with a plurality of different focal lengths, and the two calibration │
│ points are located in the field of view of the camera, and obtaining the surface image of │
│ the calibration sample in the field of view of the camera │
└─────────────────────────────────────────────────────────┘
                              │
                              ▼                        ┌─ S12
┌─────────────────────────────────────────────────────────┐
│ determining the pixel length of the pixel in the surface image of the calibration sample │
│ at each focal length based on the spacing between the two calibration points of the │
│ calibration ruler │
└─────────────────────────────────────────────────────────┘
                              │
                              ▼                        ┌─ S13
┌─────────────────────────────────────────────────────────┐
│ establishing the focal length-corrected pixel length correspondence relationship by │
│ taking the determined pixel lengths as the corrected pixel lengths respectively │
│ corresponding to different focal lengths │
└─────────────────────────────────────────────────────────┘
                              │
                              ▼
                              A
```

Fig.4

SYSTEM AND METHOD OF WELDING WORKPIECE BY VISION GUIDED WELDING PLATFORM

CROSS-REFERENCE TO RELATED APPLICATIONS

This application claims the benefit of Chinese Patent Application No. CN202110087522.X filed on Jan. 22, 2021 in the State Intellectual Property Office of China, the whole disclosure of which is incorporated herein by reference.

FIELD OF THE INVENTION

The present disclosure relates to workpiece welding and, more specifically, to a system and a method of welding a workpiece by a vision guided welding platform.

BACKGROUND

Welding machines are widely used for welding a variety of workpieces. In some welding operations, a camera with a visual guidance function is provided to guide the movement of welding tool between parts on the workpiece to ensure operational accuracy and welding performance.

When welding workpieces have different contours or workpieces are clamped in different postures, the working distance from the welding tool to the workpiece surface will change. This requires the camera for visual guidance to change its focal length according to the change of this working distance to focus on different workpiece surfaces. The size of the field of view of the camera will change with the change of its focal length. Thus, the pixel size in the image of the workpiece surface in the field of view obtained by the camera changes, resulting in the inability to accurately obtain the movement distance of the welding tool between the start point and the end point on the workpiece according to the workpiece surface image obtained by the camera.

SUMMARY

According to an embodiment of the present disclosure, a method for welding a workpiece with a vision guided welding platform is provided. The welding platform comprises a welding tool and a camera. The camera visually guides the movement of the welding tool from a start point to an end point. The method includes the steps of adjusting a focal length of the camera such that a focal plane of the camera is located on a surface of the workpiece and obtaining a surface image of the workpiece. The method further includes the steps of determining a current focal length of the camera, determining a corrected pixel length of a pixel in the surface image and determining the number of pixels between the start point and the end point of each movement of the welding tool. Using the corrected pixel length, a distance between the start and end points is determined and the welding tool is guided to move from the start point to the end point.

BRIEF DESCRIPTION OF THE DRAWINGS

The invention will now be described by way of example with reference to the accompanying Figures, of which:

FIG. 4 is a flowchart schematically showing a method of pre calibrating a camera to obtain a focal length-corrected pixel length correspondence relationship according to an exemplary embodiment of the present disclosure.

DETAILED DESCRIPTION OF THE EMBODIMENTS

Figure 1:
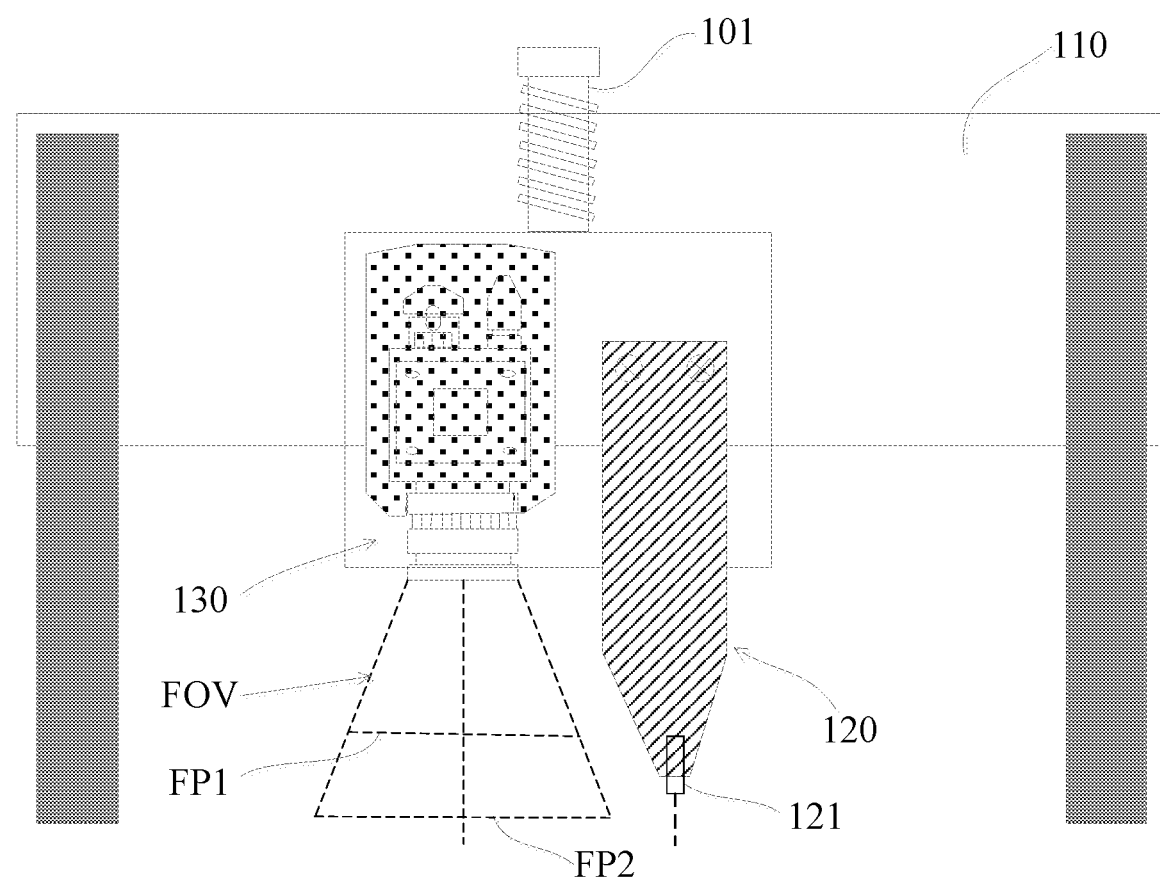
FIG. 1 is a schematic diagram showing a configuration of a vision guided welding platform according to an exemplary embodiment of the present disclosure.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

According to an embodiment of the present disclosure, a method of welding a workpiece by a vision guided welding platform is provided, the vision guided welding platform comprises a welding tool and a camera. The camera is used to visually guide the movement of the welding tool from a start point to an end point on the workpiece. The method includes the steps of adjusting a focal length of the camera such that a focal plane of the camera is located on a surface of the workpiece and obtaining a surface image of the workpiece. The method further includes the steps of determining a current focal length of the camera, determining a corrected pixel length of a pixel in the surface image and determining the number of pixels between the start point and the end point of each movement of the welding tool. Using the corrected pixel length, a distance between the start and end points is determined and the welding tool is guided to move from the start point to the end point.

As shown schematically in FIG. 1, the vision guided welding platform includes a welding tool 120 and a camera 130. The welding tool 120 and the camera 130 may be installed to a frame 110, and the distance between the welding tool 120 or the camera 130 and the workpiece surface may be adjusted by an adjustment mechanism 101. The welding tool 120 has a welding head or welding nozzle 121, which emits a light beam (e.g., a laser) to weld the workpiece. The camera 130 is used to visually guide the movement of the welding tool 120 from the start point to the end point on the workpiece. The camera 130 may be a zoom camera, or a camera with an adjustable focal length. For example, the camera is used to obtain an image of the surface of the workpiece and determine the distance or length from the start point to the end point that the welding tool will move on the workpiece based on the image (for example, analyzing or processing the image with a processor of the system or embedded within the camera). As an example, this welding platform can perform spot welding on the workpiece and visually guide the movement of the welding tool from one welding point (the start point) to another welding point (the end point) on the workpiece through a camera.

In some examples, the distance between the center line of the field of view of the camera 130 and the laser beam center line of the welding tool 120 in the moving direction of the welding tool is preset or adjustable to determine the distance between the start point and the end point that the welding tool will actually move on the workpiece, so as to accurately guide the movement of the welding tool on the workpiece.

Figure 2:
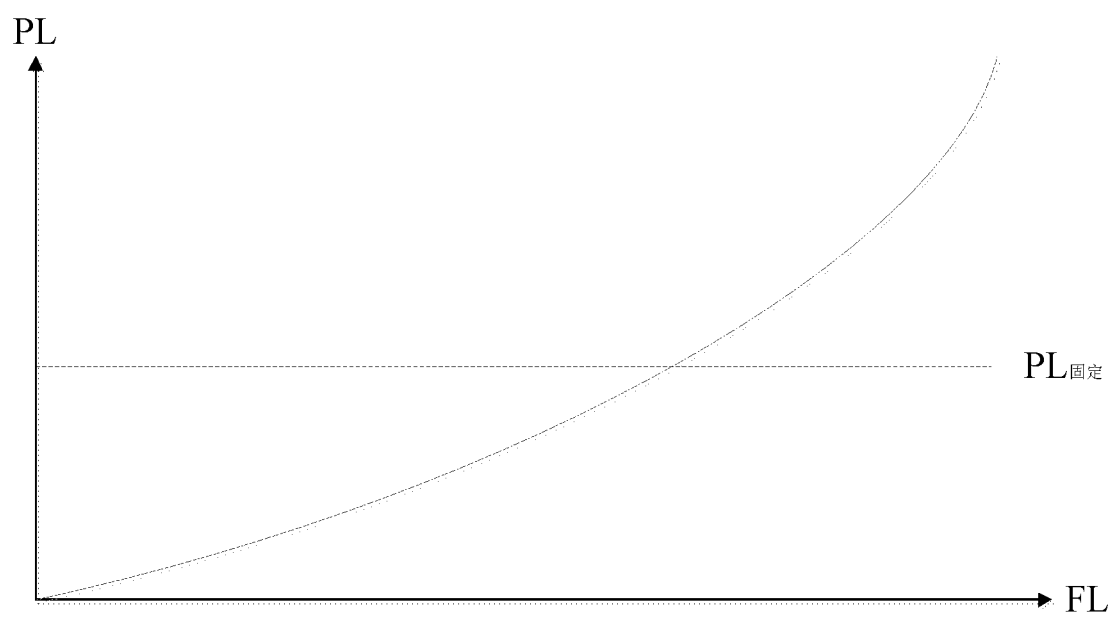
FIG. 2 is a graph schematically showing a focal length-corrected pixel length correspondence relationship according to an exemplary embodiment of the present disclosure.

As shown in FIG. 1, due to the different distances between the surfaces of different workpieces and the camera lens, the camera 130 needs to focus on the different workpiece surfaces with different focal lengths to obtain clear images, that is, when the camera focuses on different workpiece surfaces, its focal planes FP1 and FP2 may be different, which leads to the change of the size of the field of view of the camera 130 on the workpiece surface. When the camera acquires the surface images of the different workpiece surfaces in the field of view at different focal lengths, the pixel sizes in the surface images of the different workpieces (as described below with the pixel length as an example) are different due to the pixel size offset. In conventional welding technology, no matter what focal length the camera focuses on the workpiece surface, the movement distance between the start point and end point of the welding tool is usually calculated with a fixed pixel length (the pixel length PL shown in FIG. 2 is fixed), which is inaccurate and cannot reflect the pixel size offset in the images obtained on the surfaces of different workpieces.

Embodiments of the present disclosure provides a method for welding a workpiece by a vision guided welding platform which can correct this pixel size offset. Specifically, when the camera focuses on the workpiece surface with different focal lengths FL, the movement distance or length between the start point and the end point of the welding tool is determined or calculated by the corrected pixel length PL corresponding to the focal length FL (see the curve of FIG. 2), to more accurately guide the movement of the welding tool between different positions of the workpiece, such as different welding points.

Figure 3:
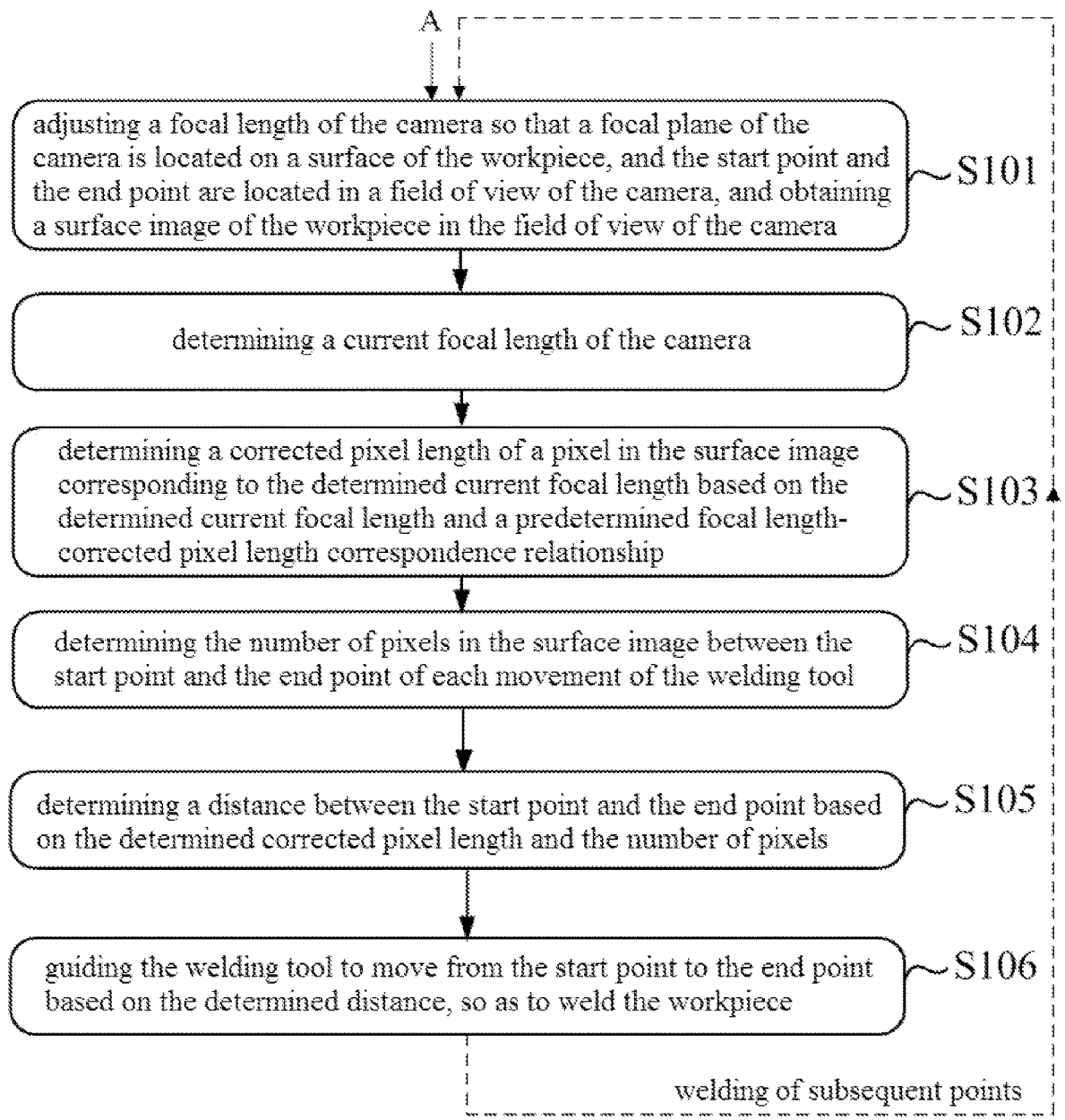
FIG. 3 is a flowchart schematically showing a method of welding a workpiece by a vision guided welding platform according to an exemplary embodiment of the present disclosure.

In some embodiments, as shown in FIG. 3, the method of welding a workpiece by a vision guided welding platform mainly includes the following steps:

S101: adjusting the focal length FL of the camera 130 so that the camera 130 focuses on the surface of the workpiece. Specifically, the focal plane of the camera is located on or coincides with the surface of the workpiece. At least the start point and the end point of the welding tool 120 moving on the workpiece are located in the field of view of the camera 130. The surface image of the workpiece in the field of view of the camera 120 is then obtained. In some examples, the start point or the end point that the welding tool will move on the workpiece can be the part or weld point on the workpiece to be welded, or the point between these parts or weld points. In other examples, the impact position of the beam (such as laser beam) of the welding tool on the workpiece surface may also be located in the field of view of the camera.

S102: determining the current focal length of the camera. The current focal length of the camera can be detected by a sensor or obtained from the camera itself, which is not limited in the present disclosure.

S103: determining the corrected pixel length PL of the pixel in the workpiece surface image acquired by the camera corresponding to the determined current focal length FL based on the determined current focal length and a predetermined focal length-corrected pixel length correspondence relationship (for example, as shown in FIG. 2).

Unlike the conventional technology in which a fixed pixel length is used to calculate the moving distance of the welding tool under various camera focal lengths, according to the embodiment of the present disclosure, the focal length-corrected pixel length correspondence relationship includes the corrected pixel lengths respectively corresponding to different focal lengths of the camera, and the corrected pixel lengths respectively corresponding to different focal lengths may be different from each other. For example, the focal length-corrected pixel length correspondence relationship may be reflected by a variety of charts, expressions, etc. characterizing the correspondence relationship between the focal length and the corrected pixel length of the camera, such as the curve shown in FIG. 2, or other suitable maps or tables. Such data may be stored in memory, such as in a memory device of the camera for access by an image processor.

S104: determining the number of pixels in the workpiece surface image between the start point and the end point of each movement of the welding tool. This can be achieved by a suitable image processor or tool (e.g., of the camera), such as digitizing or pixelating the workpiece surface image.

S105: determining the distance or length between the start point and the end point of the welding tool based on the determined corrected pixel length PL and the number of pixels N. For example, the distance or length P between the start and the end point of the welding tool may be calculated by the following formula:

$$P = N \times PL, \quad P = \Sigma_N^i PL_i$$

in which $PL_i$ represents the pixel length of each pixel between the start point and the end point of the welding tool.

S106: guiding or controlling the welding tool to move from the start point to the end point based on the determined distance to weld the workpiece.

The above steps can be repeated when welding the next or subsequent position or welding point on the workpiece.

According to an embodiment of the present disclosure, the camera may be calibrated before the welding operation, such as at least before visually guiding the movement of the welding tool from the start point to the end point on the workpiece, so as to determine the focal length-corrected pixel length correspondence relationship in advance.

FIG. 4 schematically illustrates a method of pre-calibrating a camera to obtain a focal length-corrected pixel length correspondence relationship according to an exemplary embodiment of the present disclosure. As shown in the figure, the method comprises steps of:

S10: providing a calibration sample and providing a calibration ruler (e.g. a scale bar) on the calibration sample, the calibration ruler has two calibration points, and a spacing between the two calibration points is known.

S11: adjusting the focal length of the camera so that the camera focuses on a surface of the calibration sample with a plurality of different focal lengths. The two calibration points are located in the field of view of the camera, and obtaining the surface image of the calibration sample in the field of view of the camera.

S12: determining the pixel length of the pixel in the surface image of the calibration sample at each focal length based on the spacing between the two calibration points of the calibration ruler.

S13: establishing the focal length-corrected pixel length correspondence relationship by taking the determined pixel lengths as the corrected pixel lengths respectively corresponding to different focal lengths. As indicated by 'A' in FIGS. 3 and 4, the established focal length-corrected pixel length correspondence relationship is then used to guide the welding tool to weld different workpieces or different points on the workpiece.

As an example, the step S12 of determining the pixel length of the pixel in the surface image of the calibration sample at each focal length comprises steps of:
  determining the number of pixels between the two calibration points of the surface image of the calibration sample; and
  determining the pixel length based on the spacing between the two calibration points and the number of pixels between the two calibration points of the determined surface image of the calibration sample. For example, the actual length of each pixel may be calculated by dividing the spacing by the number of pixels between the two calibration points.

The focal length-corrected pixel length correspondence relationship may be established in a variety of ways. In some examples, for example, the determined pixel lengths and the corresponding focal lengths are stored or recorded in a map or table. In other examples, a fitting method may be used to establish a focal length-corrected pixel length correspondence relationship. For example, a curve fitting may be performed based on a plurality of discrete focal lengths of the camera and a plurality of determined pixel lengths respectively corresponding to the plurality of discrete focal lengths, so as to obtain a fitting curve or a polynomial representing the focal length-corrected pixel length correspondence relationship. For example, the determined corrected pixel length may be a polynomial function of the focal length of the camera.

It should be understood that the above-described steps according to the methods of the present disclosure may be performed by a control system including one or more processors and associated program instructions stored on one or more memory devices. Specifically, the one or more processors maybe operative with stored program instructions for performing the steps of: adjusting a focal length of the camera; determining a current focal length of the camera; determining a corrected pixel length of a pixel in the surface image; determining the number of pixels in the surface image; determining a distance between the start point and the end point; and guiding the welding tool to move from the start point to the end point based on the determined distance to weld the workpiece. The memory device may also store any calibration data, polynomial models, maps, tables, etc. according to the above-described embodiments. The processor(s) and associated memory device(s) may be integrated into the camera 130 (and thus, the camera represents the control system in the simplified figures), or may comprise separate components.

In addition, those areas in which it is believed that those of ordinary skill in the art are familiar, have not been described herein in order not to unnecessarily obscure the invention described. Accordingly, it has to be understood that the invention is not to be limited by the specific illustrative embodiments, but only by the scope of the appended claims.

It should be appreciated for those skilled in this art that the above embodiments are intended to be illustrated, and not restrictive. For example, many modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

As used herein, an element recited in the singular and proceeded with the word "a" or "an" should be understood as not excluding plural of the elements or steps, unless such exclusion is explicitly stated. Furthermore, references to "one embodiment" of the present disclosure are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

What is claimed is:

1. A system for welding a workpiece, comprising:
  a vision guided welding platform, including:
    a welding tool;
    a camera visually guiding the movement of the welding tool from a start point to an end point on the workpiece; and
  a control system operatively connected to the welding tool and the camera, the control system responsive to a set of program instructions for:
    obtaining a surface image of the workpiece in a field of view of the camera;
    determining a current focal length of the camera;
    determining a corrected pixel length of a pixel in the surface image corresponding to the determined current focal length based on the determined current focal length and a predetermined focal length-corrected pixel length correspondence relationship, the predetermined focal length-corrected pixel length determined by:
      determining the focal length-corrected pixel length correspondence relationship according to a calibration sample and a calibration scale provided on the calibration sample;
      adjusting the focal length of the camera so that the camera focuses on a surface of the calibration sample with a plurality of different focal lengths, and two known calibration points are located in the field of view of the camera, and obtaining the surface image of the calibration sample in the field of view of the camera;
      determining the pixel length of the pixel in the surface image of the calibration sample at each focal length based on a known spacing between the two known calibration points of the calibration scale; and
      establishing the focal length-corrected pixel length correspondence relationship by taking the determined pixel lengths as the corrected pixel lengths respectively corresponding to different focal lengths;

determining a number of pixels in the surface image between the start point and the end point of each movement of the welding tool; and determining a distance between the start point and the end point based on the determined corrected pixel length and the number of pixels.

2. The system according to claim 1, wherein the control system, prior to obtaining the surface image of the workpiece, adjusts a focal length of the camera such that a focal plane of the camera is located on a surface of the workpiece, and the start point and the end point are located in a field of view of the camera.

3. The system according to claim 2, wherein the control system guides the welding tool to move from the start point to the end point based on the determined distance to weld the workpiece.

4. The system according to claim 3, wherein the focal length-corrected pixel length correspondence relationship includes corrected pixel lengths respectively corresponding to different focal lengths of the camera.

5. The system according to claim 4, wherein the focal length-corrected pixel length correspondence relationship includes a map representing the correspondence relationship between the focal length and the corrected pixel length of the camera.

6. The system according to claim 4, wherein the corrected pixel lengths respectively corresponding to different focal lengths of the camera are different from each other.

7. The system according to claim 4, wherein the control system determines the focal length-corrected pixel length correspondence relationship before visually guiding the movement of the welding tool from the start point to the end point on the workpiece.

8. The system according to claim 1, wherein the control system performs a curve fitting operation based on a plurality of discrete focal lengths of the camera and a plurality of determined pixel lengths respectively corresponding to the plurality of discrete focal lengths for obtaining a fitting curve or a polynomial representing the focal length-corrected pixel length correspondence relationship.

9. The system according to claim 1, wherein a distance between a center line of the field of view of camera and a laser beam center line of the welding tool in a movement direction of the welding tool is adjustable by the system.

10. A method for welding a workpiece by a vision guided welding platform, the vision guided welding platform comprises a welding tool and a camera, the camera visually guiding the movement of the welding tool from a start point to an end point on the workpiece, the method comprising steps of:

adjusting a focal length of the camera such that a focal plane of the camera is located on a surface of the workpiece, and the start point and the end point are located in a field of view of the camera;

obtaining a surface image of the workpiece in the field of view of the camera;

determining a current focal length of the camera;

determining a corrected pixel length of a pixel in the surface image corresponding to the determined current focal length based on the determined current focal length and a predetermined focal length-corrected pixel length correspondence relationship, the predetermined focal length-corrected pixel length determined by providing a calibration sample and providing a calibration scale on the calibration sample, wherein the calibration scale has two calibration points, and a spacing between the two calibration points is known, the predetermined focal length-corrected pixel length correspondence relationship determined by:

adjusting the focal length of the camera so that the camera focuses on a surface of the calibration sample with a plurality of different focal lengths, and the two calibration points are located in the field of view of the camera, and obtaining the surface image of the calibration sample in the field of view of the camera;

determining the pixel length of the pixel in the surface image of the calibration sample at each focal length based on the spacing between the two calibration points of the calibration scale; and establishing the focal length-corrected pixel length correspondence relationship by taking the determined pixel lengths as the corrected pixel lengths respectively corresponding to different focal lengths;

determining a number of pixels in the surface image between the start point and the end point of each movement of the welding tool;

determining a distance between the start point and the end point based on the determined corrected pixel length and the number of pixels; and guiding the welding tool to move from the start point to the end point based on the determined distance to weld the workpiece.

11. The method according to claim 10, wherein the focal length-corrected pixel length correspondence relationship includes corrected pixel lengths respectively corresponding to different focal lengths of the camera.

12. The method according to claim 11, wherein the focal length-corrected pixel length correspondence relationship includes a map representing the correspondence relationship between the focal length and the corrected pixel length of the camera.

13. The method according to claim 11, wherein the corrected pixel lengths respectively corresponding to different focal lengths of the camera are different from each other.

14. The method according to claim 10, wherein the step of determining the focal length-corrected pixel length correspondence relationship is performed before visually guiding the movement of the welding tool from the start point to the end point on the workpiece.

15. The method according to claim 10, wherein the step of determining the pixel length of the pixel in the surface image of the calibration sample at each focal length comprises steps of:

determining the number of pixels between the two calibration points of the surface image of the calibration sample; and determining the pixel length based on the spacing between the two calibration points and the number of pixels between the two calibration points of the determined surface image of the calibration sample.

16. The method according to claim 10, wherein the step of establishing the focal length-corrected pixel length correspondence relationship comprises a step of performing a curve fitting based on a plurality of discrete focal lengths of the camera and a plurality of determined pixel lengths respectively corresponding to the plurality of discrete focal lengths, so as to obtain a fitting curve or a polynomial representing the focal length-corrected pixel length correspondence relationship.

17. The method according to claim 16, wherein the corrected pixel length is a polynomial function of the focal length.

18. A system for welding a workpiece, comprising:
a vision guided welding platform, including:

a welding tool;
a camera visually guiding the movement of the welding tool from a start point to an end point on the workpiece; and
a control system operatively connected to the welding tool and the camera, the control system responsive to a set of program instructions for:
obtaining a surface image of the workpiece in a field of view of the camera;
determining a current focal length of the camera;
determining a corrected pixel length of a pixel in the surface image corresponding to the determined current focal length based on the determined current focal length and a predetermined focal length-corrected pixel length correspondence relationship determined according to a calibration sample, the predetermined focal length-corrected pixel length determined by:
adjusting the focal length of the camera so that the camera focuses on a surface of a calibration sample with a plurality of different focal length; and
determining the pixel length of the pixel in a surface image of the calibration sample at each focal length; and
determining a number of pixels in the surface image between the start point and the end point of each movement of the welding tool; and
determining a distance between the start point and the end point based on the determined corrected pixel length and the number of pixels.

19. The system according to claim 18, wherein:

a calibration scale is provided on the sample and includes two calibration points separated by a known distance; and determining the predetermined focal length-corrected pixel length further includes determining the pixel length of the pixel in the surface image of the calibration sample at each focal length based on the spacing between the two calibration points of the calibration scale.

* * * * *